United States Patent [19]

Orthman et al.

[11] 4,453,601
[45] Jun. 12, 1984

[54] 180° FOLDING TOOL BAR

[75] Inventors: Henry K. Orthman; Jay Stombaugh, both of Lexington, Nebr.

[73] Assignee: Orthman Manufacturing, Inc., Lexington, Nebr.

[21] Appl. No.: 361,342

[22] Filed: Mar. 24, 1982

[51] Int. Cl.³ ............................................. A01B 73/00
[52] U.S. Cl. ................................... 172/311; 172/456; 172/776
[58] Field of Search ............... 172/126, 128, 130, 311, 172/446, 456, 666, 662, 776

[56] References Cited

U.S. PATENT DOCUMENTS

| | | | |
|---|---|---|---|
| 3,944,001 | 3/1976 | Warner et al. | 172/311 |
| 4,074,766 | 2/1978 | Orthman | 172/456 X |
| 4,281,720 | 8/1981 | Tusing | 172/126 |
| 4,342,367 | 8/1982 | Gates | 403/119 X |

FOREIGN PATENT DOCUMENTS 2345898 10/1977 France ................................ 172/311

Primary Examiner—Richard T. Stouffer
Assistant Examiner—William H. Honaker
Attorney, Agent, or Firm—Zarley, McKee, Thomte, Voorhees & Sease

[57] ABSTRACT

A 180° folding tool bar for an agricultural implement is described including a main frame having wing sections pivotally mounted on the ends of the main frame which are movable between field and transport positions. A hydraulic cylinder is positioned within the main frame at each end thereof and has one end connected to the main frame. The rod end of each of the hydraulic cylinders is connected to one end of a wheeled carriage with the other end of the wheeled carriage being pivotally connected to the inner end portion of the associated wing section. The inner end of the carriage has a horizontally disposed slot which receives the rod end of the hyraulic cylinder to enable the wing section to float relative to the main frame when in the field position. A locking mechanism is provided on the carriage for locking the rod end of the hydraulic cylinder at the outer end of the horizontal slot as the hydraulic cylinder is operated to move the wing section between its field and transport positions thereby preventing undesirable free fall of the wing section during the movement of the wing section between its field and transport positions and vice versa.

8 Claims, 11 Drawing Figures

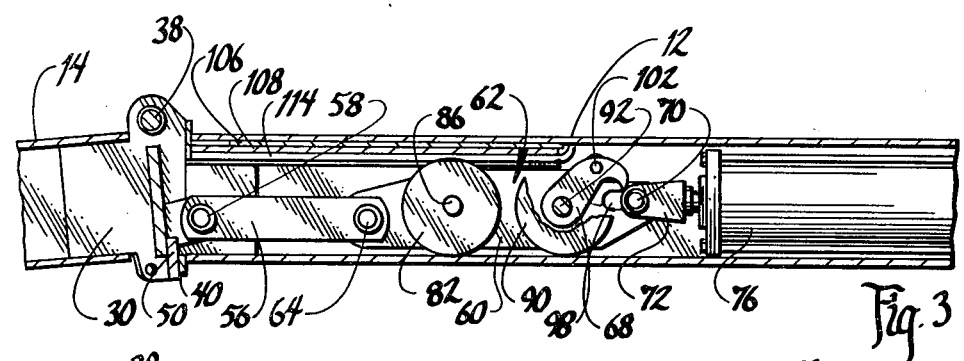
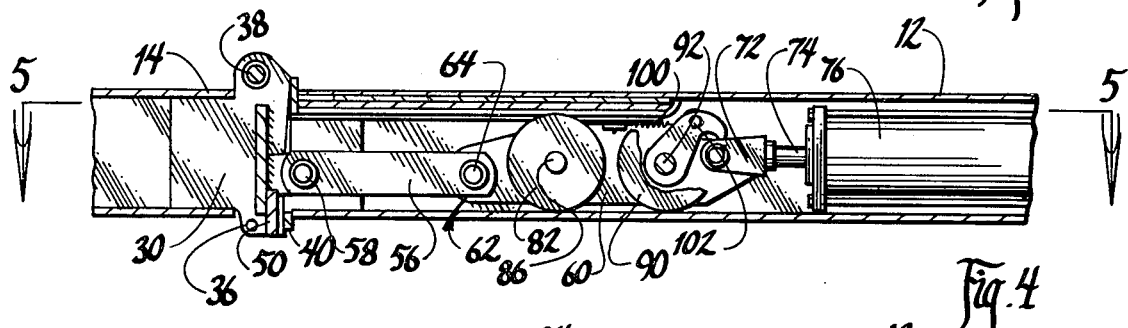
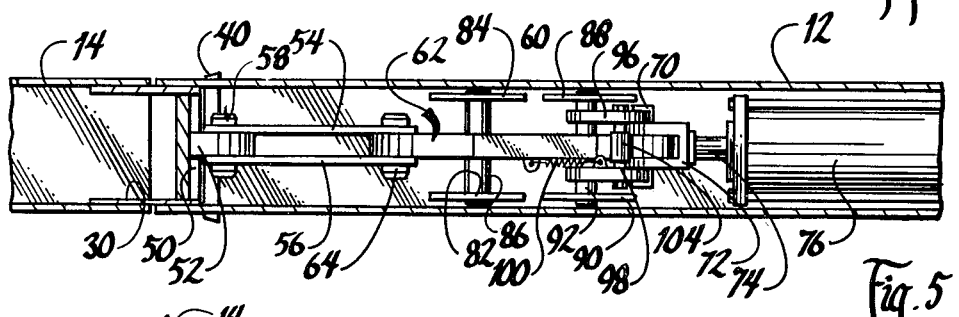
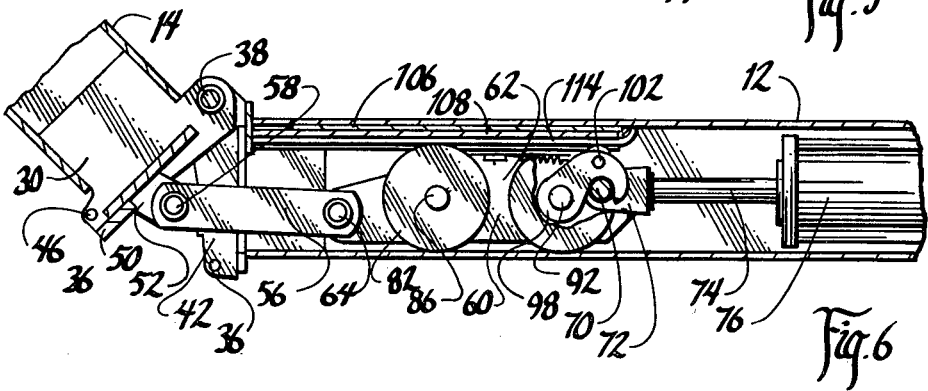
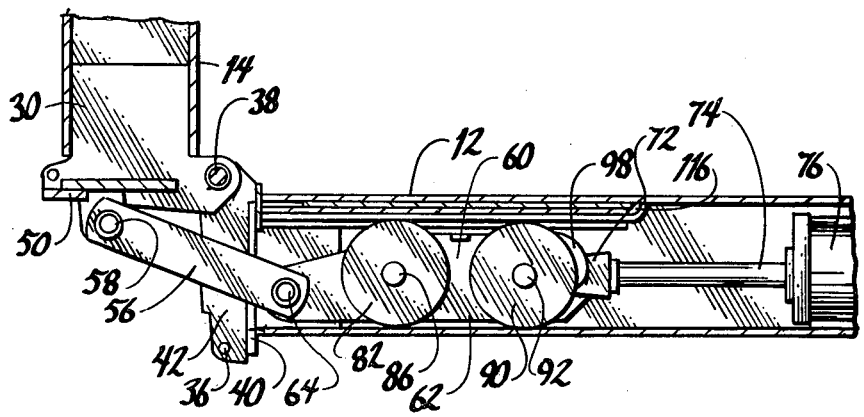

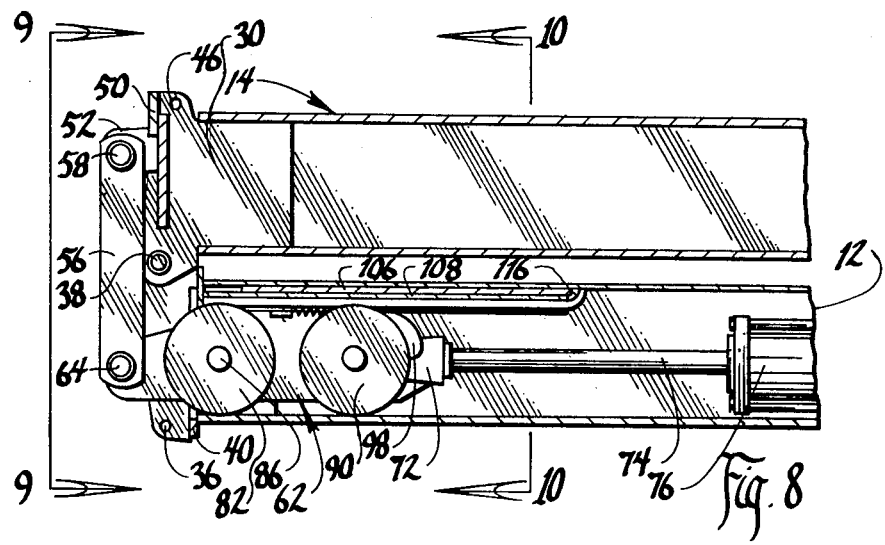
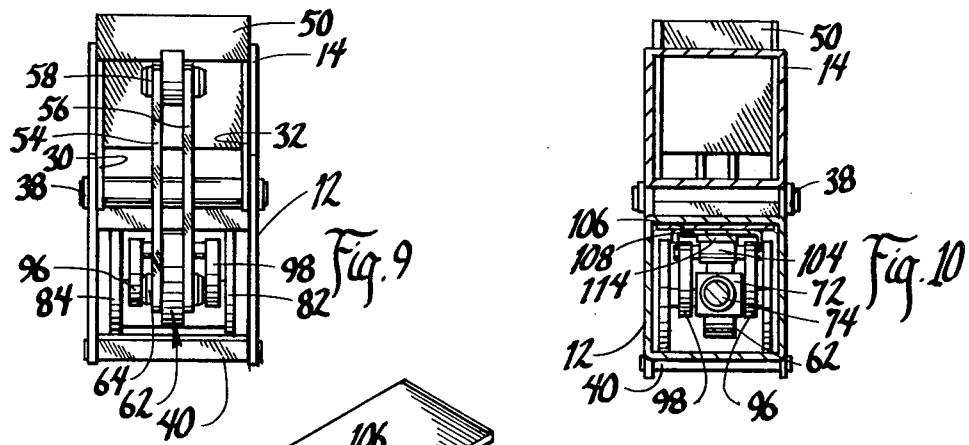
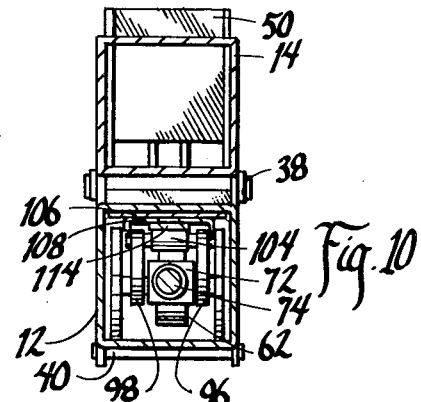
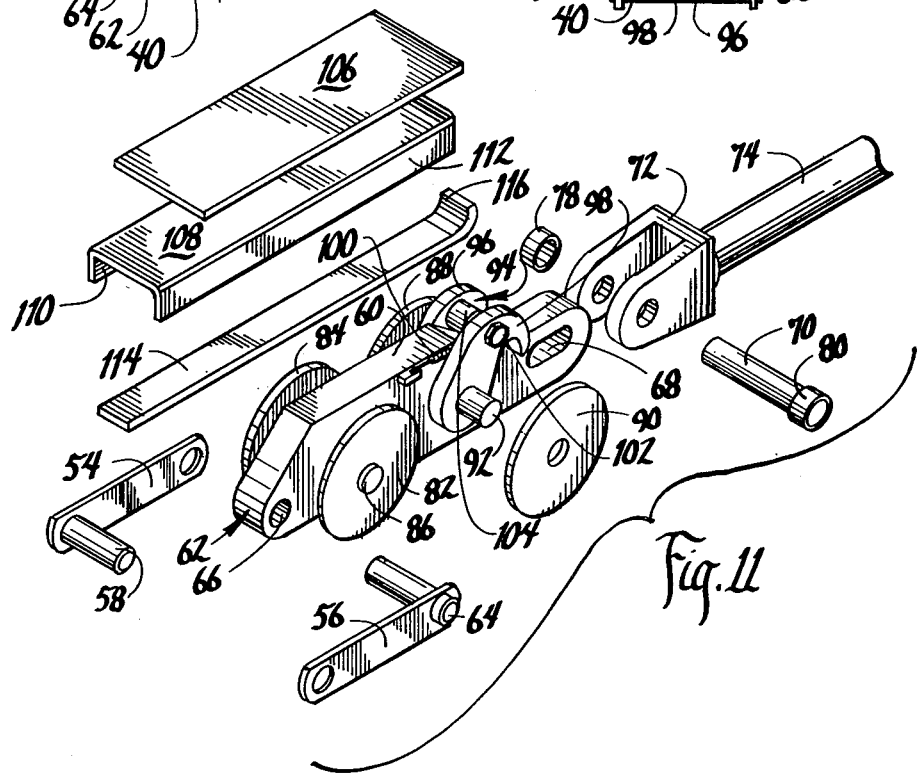

180° FOLDING TOOL BAR

BACKGROUND OF THE INVENTION

This invention relates to a 180° folding tool bar and more particularly to a folding tool bar which has float capability and which eliminates free fall of the wing section as it is being pivotally moved between its field and transport positions.

Folding tool bars have for some time been used on agricultural implements to enable the width of the implement to be substantially reduced for transport purposes. For example, folding tool bars are described in U.S. Pat. Nos. 3,774,693; 3,941,194; and 4,074,766. In each of the tool bars of the foregoing patents, the wing sections are able to be pivoted to an upright position or approximately 90° with respect to the main frame. Additionally, International Harvester is presently manufacturing an agricultural implement wherein the wing sections of the folding tool bar are pivoted 180° with respect to the main frame.

In all of the agricultural implements employing a folding tool bar, a highly desirable feature is the ability of the wing sections to "float" with respect to the main frame so that the implement may conform to the contour of the ground. Obviously, if the wing section is to pivotally move upwardly and downwardly with respect to the main frame thereby achieving the desirable "float", some play or lost motion must be permitted in the pivotal connection between the hydraulic cylinder, which pivots the wing section, and the wing section to prevent the hydraulic fluid from being passed through the cylinder each time the wing section pivotally moves upwardly and downwardly during field operations. One method of providing the necessary pivotal connection between the hydraulic cylinder and the wing section is to have the rod end of the hydraulic cylinder received in a horizontally disposed slot in a linkage connecting the hydraulic cylinder and the wing section. Such a connection is described in U.S. Pat. No. 4,074,766. However, a problem is experienced in such a connection when the wing section is to be pivoted 180° with respect to the main frame. This phenomenon is known as free fall and creates a very serious problem. During certain portions of the travel of the wing section between the transport and field positions, the rod end of the hydraulic cylinder moves in the slot within which it is received thereby causing the wing section to fall, out of control, for a certain amount of distance. The free fall of the wing section is not only dangerous to the operator but can severely damage the equipment.

Therefore, it is a principal object of the invention to provide an improved 180° folding tool bar.

A further object of the invention is to provide a 180° folding tool bar which permits the wing sections to float with respect to the main frame during field operations.

A still further object of the invention is to provide a folding 180° tool bar which not only permits the wing sections to float but also prevents free fall of the wing section.

These and other objects will be apparent to those skilled in the art.

BRIEF DESCRIPTION OF THE DRAWINGS

FIG. 3 is a partial longitudinal sectional view illustrating the wing section in the field position and the hydraulic cylinder in its completely retracted position:

FIGS. 4, 5, 6, 7 and 8 are views similar to FIG. 3 illustrating the hydraulic cylinder being operated or extended to pivotally move the wing section from the field position to the transport position:

FIG. 9 is a view as seen on lines 9—9 of FIG. 8:

FIG. 10 is a sectional view seen on lines 10—10 of FIG. 8; and

FIG. 11 is an exploded perspective view of the connection between the hydraulic cylinder and the wing section.

SUMMARY OF THE INVENTION

Figure 1:
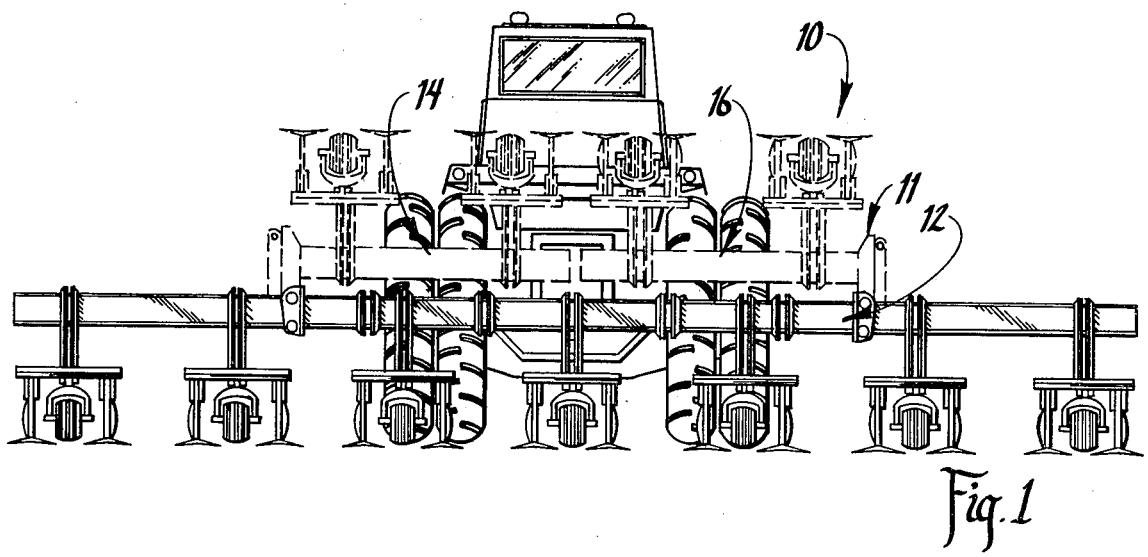
FIG. 1 is a rear view of the folding tool bar of this invention with the broken lines illustrating the wing sections in the field position.

The folding tool bar of this invention comprises a main frame having at least one wing section pivotally mounted at one end thereof. A hydraulic cylinder is mounted within the main frame and has its base end secured to the main frame. The rod end of the hydraulic cylinder has a U-shaped clevis which is movably secured to a horizontally disposed slot formed in one end of a wheeled carriage or trolley which is movably mounted within the main frame. The outer end of the carriage is pivotally connected by means of a linkage to the inner end of the wing section. The connection between the rod end of the cylinder and the horizontal slot permits the wing section to float relative to the main frame during field operations. A locking means comprised of a pair of latch hooks is pivotally mounted on the carriage and is normally maintained in an unlocked position by means of a spring. The locking means is moved into a locked position on the pin connecting the hydraulic cylinder to the horizontal slot in the carriage as the cylinder is being actuated to move the wing section between its field and transport positions and vice versa. A cam track is mounted within the main frame and is engaged by a cam on the locking means as the hydraulic cylinder is being operated to move the latch members into engagement with the pin.

DESCRIPTION OF THE PREFERRED EMBODIMENT

The numeral 10 refers generally to an agricultural implement including the 180° folding tool bar 11 of this invention. Tool bar 11 comprises a main tubular frame 12 having tubular wing sections 14 and 16 pivotally connected thereto. Inasmuch as wing sections 14 and 16 are identically pivotally connected to the outer ends of main frame 12, only the pivotal connection between wing section 14 and main frame 12 will be described in detail.

Frame 12 is formed from a hollow tubular member 18 having a top wall portion 20, bottom wall portion 22, and opposite side wall portions 26 and 28. A pair of laterally spaced apart upstanding plates 30 and 32 are provided at the outer end at tubular member 18. As seen in the drawings, the lower ends of plates 30 and 32 have openings 34 and 36 formed therein respectively adapted to receive a pin or bolt (not shown) therein at times to rigidly secure wing section 14 to main frame 12 when it is desired to prevent the wing section from "floating" with respect to the main frame. The upper ends of plates 30 and 32 are each provided with an opening adapted to receive bolt 38 extending therethrough for pivotally connecting the wing section 14 and main frame 12. pad 40 is secured to the lower outer end of main frame 12.

Wing section 14 is also provided with a pair of laterally spaced upstanding plates 42 and 44 at its inner end having openings 46 and 48 at the lower ends thereof respectively which are adapted to register with openings 34 and 36 to permit the bolt or pin to extend therethrough to lock wing section 14 relative to main frame 12 as previously described. The upper ends of plates 42 and 44 each have an opening formed therein which is adapted to align with the openings in the upper ends of plates 30 and 32 for receiving bolt 38 to effect the pivotal connection between main frame 12 and wing section 14.

Figure 2:
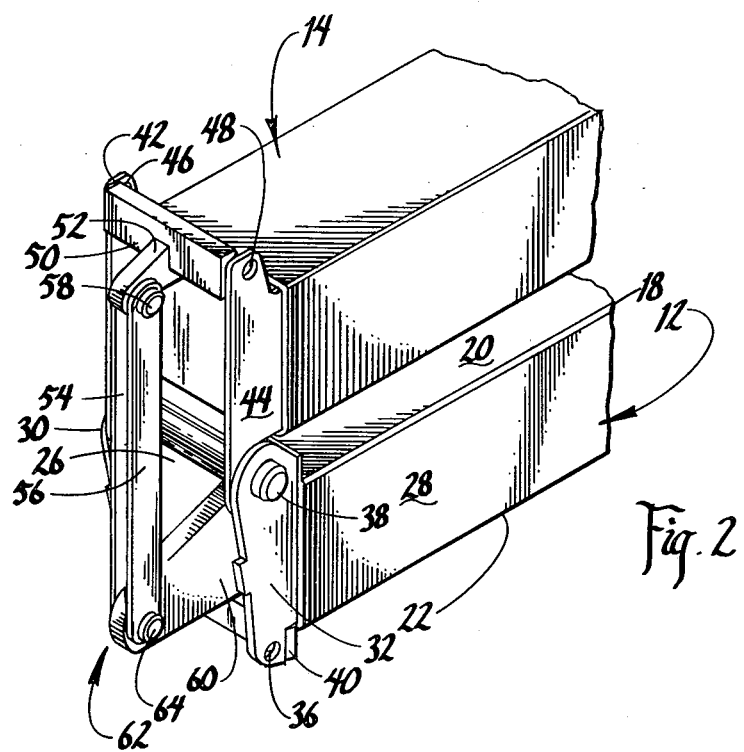
FIG. 2 is a partial perspective view of the pivotal connection between the main frame and the wing section.

Bar 50 is secured to and extends between plates 42 and 44 as illustrated in FIG. 2. Plate 50 is adapted to engage the pad 40 to limit the downward pivotal movement of wing section 14 with respect to main frame 12. Bar 50 has an ear 52 depending therefrom which has a pair of connecting straps 54 and 56 pivotally secured thereto by bolt 58. The inner ends of straps 54 and 56 are pivotally connected to the outer end of center frame portion 60 of carriage 62 by bolt or pin 64 extending through opening 66. The inner end of center frame portion 62 has a horizontally disposed slot 68 formed therein which movably receives pin 70 extending through clevis 72 mounted on the end of cylinder rod 74 of hydraulic cylinder 76. Pin 70 has bushings 78 and 80 on its opposite ends which are positioned outwardly of clevis 72.

Guide wheels 82 and 84 are rotatably mounted on axle 86 extending through center frame portion 60 inwardly of the outer end thereof. Guide wheels 88 and 90 are rotatably mounted on axle 92 extending through center frame portion 60 outwardly of the inner end thereof. A locking or latching assembly 94 is pivotally mounted on center frame portion 60 including a pair of laterally spaced latch hooks 96 and 98 pivotally mounted on axle 92 and movable between a latched or locked position to the unlocked or unlatched position of FIG. 3. Spring 100 extends between center frame portion 60 and assembly 94 to yieldably maintain assembly 94 in the unlatched position. Bolt or pin 102 extends between hooks 96 and 98 and has cam roller 104 rotatably mounted thereon between the hooks 96 and 98.

Shim plate 106 is secured to the inside surface of top wall portion of main frame 12 adjacent the outer end thereof and has its outer end terminating inwardly of the outer end of main frame 12. Guide channel 108 is secured to the underside of shim plate 106 and has legs 110 and 112 depending downwardly therefrom which are positioned inwardly of the wheels on the carriage 62 as best seen in FIG. 10. Cam track 114 is mounted on the underside of guide channel 108 and has an end portion 116 at its inner end which extends upwardly therefrom.

FIG. 3 illustrates the wing section 14 in its field position. The wing section 14 is not locked or maintained in a rigid position relative to main frame 12 since the pin or bolt adapted to extend through the openings in the lower ends of the plates 30, 32, 44 and 46 has been removed. Normally, the hydraulic cylinder 76 would be extended slightly from the position of FIG. 3 so that the pin 70 would be positioned adjacent the outer end of the slot 68 so that the wing section 14 could "float" upwardly from the position of FIG. 3 since outward movement of the carriage 62 would not exert any force on the pin 70 until the carriage 62 has traveled a distance corresponding to the length of the slot 68.

When it is desired to pivotally move the wing section 14 from the field position of FIG. 3 to the transport position of FIG. 8, hydraulic cylinder 76 is actuated to cause the extension of the rod 74 thereby moving the pin 70 to the outer end of the slot 68 as seen in FIG. 4. Continued extension of the cylinder rod 74 from the cylinder 76 causes the carriage 62 to move outwardly. The cam roller 104 engages the end portion 116 of cam track 114 and causes the cam roller 104 and the hooks 96 and 98 to move downwardly relative to the carriage 62 so that the latch hooks 96 and 98 embrace the outer ends of the pin 70 as seen in FIG. 8. When the latch hooks are in the locked position of FIG. 8, relative movement between pin 70 and the carriage 62 has been eliminated since the latch hooks 96 and 98 prevent any relative movement therebetween.

Continued extension of the rod 74 from the hydraulic cylinder 76 causes the wing section 14 to be pivoted until the wing section 14 is in the transport position of FIG. 8. As previously described, the outer end of shim plate 106 terminates inwardly of the outer end of main frame 12 which permits the wheels 84 and 86 to be pulled upwardly to the underside of top wall portion 20 of main frame 12 when the carriage 62 is positioned in its outermost position. By permitting the wheels 82 and 84 to be pulled upwardly to the underside of the top wall portion 20, the connecting straps 54 and 56 may be shortened enough to provide sufficient clearance beneath the wheels to accommodate the differential in distance between pins 64 and 58 since pin 64 travels in substantially a flat plane while pin 18 moves in a true arc over pivot point 38. This pinch point is passed by the time the wheels 82 and 84 move beneath the shim plate 106.

The wing section 14 may be pivotally moved from the transport position of FIG. 8 to the field position of FIG. 1 by simply retracting the rod 74 in the cylinder 76. The latch hooks 96 and 98 remain locked onto the pin 70 until the cam wheel 104 disengages from the cam track 114 thereby permitting the wing section to "float" as previously described. The ability of the hydraulic cylinder to be locked or latched to the carriage 62 during the pivotal movement of the wing section between its transport and field positions eliminates the problem of free fall and thereby prevents possible injury to the operator or damage to the equipment.

Thus it can be seen that the tool bar of this invention accomplishes at least all of its stated objectives.

We claim:
1. An agricultural implement comprising, a 180° hydraulic folding tool bar including a main tubular frame and at least one tubular wing section being pivotally movable between field and transport positions,
   said main frame having an outer end portion with upper and lower ends,
   said wing section having an upper inner end portion which is connected to the upper outer end portion of said main frame for pivotal movement about a single pivot axis,
   a hydraulic cylinder positioned within said main frame and having one end connected to said main frame,
   a wheeled carriage movably mounted in said main frame and having inner and outer ends,
   a first linkage means pivotally connected to and extending between the outer end of said carriage and the inner end portion of said wing section, the inner end of said carriage having a horizontally disposed slot, with inner and outer ends, formed therein which movably receives the other end of said hydraulic cylinder whereby said wing section may pivotally float relative to said main frame when said wing section is in its field position, said hydraulic cylinder being provided with a horizontally disposed pin which is movably received by said slot, and means on said carriage for locking said other end of said hydraulic cylinder at the outer end of said slot as said hydraulic cylinder is extended to move said wing section from its field position to its transport position and as said hydraulic cylinder is retracted to move said wing section from its said transport position to its said field position, said locking means including a latch hook assembly which engages said pin, said latch hook assembly comprising at least one latch hook which is pivotally mounted, about a horizontal axis on said carriage and which is movable between a latched position on said hydraulic cylinder pin and an unlatched position off of said hydraulic cylinder pin.

2. The implement of claim 1 wherein said carriage comprises a center frame portion having inner and outer ends, a first pair of wheel members rotatably mounted, about a horizontal axis transverse to the longitudinal axis of said main frame, on said center frame portion inwardly of the outer end thereof and a second pair of wheel members rotatably mounted, about a horizontal axis transverse to the longitudinal axis of said main frame, on said center frame portion outwardly of the inner end thereof, said slot being formed in the inner end of said center frame portion.

3. The implement of claim 2 wherein a longitudinally extending guide track is positioned within said main frame for guiding said first and second pairs of wheel members.

4. The implement of claim 2 wherein said first linkage means comprises a pair of connecting straps pivotally secured to and extending between the outer end of said carriage and the inner end of said wing section.

5. The implement of claim 2 wherein an elongated shim plate is positioned in said main frame above said carriage, said shim plate having an outer end which terminates inwardly of the outer end of said main frame, said shim plate preventing vertical movement of said first and second pairs of wheels during substantially the entire travel of said carriage relative to said main frame.

6. The implement of claim 1 further comprising a spring means yieldably maintaining said latch hook in its said unlatched position, and means in said main frame for moving said latch hook into its said latched position against the urging of said spring means as said wing section is being moved between its field and transport positions.

7. The implement of claim 6 wherein said latch hook assembly comprises a pair of spaced apart latch hooks which engage the opposite ends of said hydraulic cylinder pin.

8. An agricultural implement comprising, a 180° hydraulic folding tool bar including a main tubular frame and at least one tubular wing section being pivotally movable between field and transport positions, said main frame having an outer end portion with upper and lower ends, said wing section having an upper inner end portion which is connected to the upper outer end portion of said main frame for pivotal movement about a single pivot axis, a hydraulic cylinder positioned within said main frame and having one end connected to said main frame, a wheeled carriage movably mounted in said main frame and having inner and outer ends, a first linkage means pivotally connected to and extending between the outer end of said carriage and the inner end portion of said wing section, the inner end of said carriage having a horizontally disposed slot, with inner and outer ends, formed therein which movably receives the other end of said hydraulic cylinder whereby said wing section may pivotally float relative to said main frame when said wing section is in its field position, and means on said carriage for locking said other end of said hydraulic cylinder at the outer end of said slot as said hydraulic cylinder is extended to move said wing section from its field position to its transport position and as said hydraulic cylinder is retracted to move said wing section from its said transport position to its said field position, said carriage comprising a center frame portion having inner and outer ends, a first pair of wheel members rotatably mounted, about a horizontal axis transverse to the longitudinal axis of said main frame, on said center frame portion inwardly of the outer end thereof and a second pair of wheel members rotatably mounted, about a horizontal axis transverse to the longitudinal axis of said main frame, on said center frame portion outwardly of the inner end thereof, said slot being formed in the inner end of said center frame portion, said hydraulic cylinder being provided with a horizontally disposed pin which is movably received by said slot, said locking means including a latch hook assembly which engages said pin, said latch hook assembly comprising at least one latch hook which is pivotally mounted, about a horizontal axis, on said carriage and which is movable between latched and unlatched positions, a spring means yieldably maintaining said latch hook in its said unlatched position, and means in said main frame for moving said latch hook into its said latched position on said hydraulic cylinder pin as said wing section is being moved between its field and transport positions, said means in said main frame comprising a cam track and wherein a cam roller is operatively secured to said latch hook, the engagement of said cam roller with said cam track causing said latch hook to move to its latched position.

* * * * *